Feb. 25, 1930.　　　　G. C. MARTIN　　　　1,748,237
SHOCK ABSORBER
Filed July 19, 1926

INVENTOR:
George C. Martin,
BY Blakeslee & Brown
ATTORNEYS.

Patented Feb. 25, 1930

1,748,237

UNITED STATES PATENT OFFICE

GEORGE C. MARTIN, OF LOS ANGELES, CALIFORNIA

SHOCK ABSORBER

Application filed July 19, 1926. Serial No. 123,314.

This invention relates to shock absorbers, and has for an object the provision of a shock absorber which will control spring action in two directions.

Another object is the provision of a shock absorber adapted to control spring action and in which the degree of control is directly regulated in accordance with the spring action.

Another object of the invention is the provision of a shock absorber in which complicated mechanism is entirely done away with.

The present invention contemplates a shock absorber in which the resistance to movement of an arm is in proportion to such movement. To this end the shock absorber is so arranged that the arm will have a selected position of release and movement from such selected position in either direction by the said arm, will bring into play the said shock absorber and gradually retard the movement of the arm with increasing resistance. To this end it will immediately be seen that a shock absorber of this character will, when the same is controlling movement of springs of a motor vehicle, damp out minor irregularities and spring actions due to movement of said vehicle over roads, as well as effectively handle all large irregularities. The movement permits the vehicle to have a resilient action of the springs without noticeable shock, rather than the effect so noticeable where snubbers are used in the controlling of spring action. In the case of a snubber the re-action of a spring is checked. With the present invention both action and re-action are controlled, with the result that corduroy roads are navigated as smoothly as the smooth boulevard would be.

The invention has for further objects the provision of a shock absorber of the character above stated which is simple of construction, inexpensive of manufacture, fool-proof and generally superior.

With the above and other objects in view, the invention consists in the novel and useful provision, formation, construction, association and relative arrangement of parts, members and features, all as shown in certain embodiments in the accompanying drawing, described generally and more particularly pointed out in the claims.

In the drawing.

Corresponding parts in all the figures are designated by the same reference characters.

Figure 1:
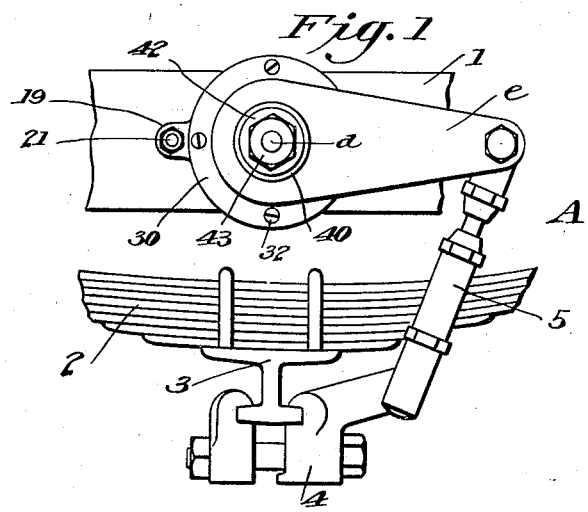
Figure 1 is a fragmentary side elevation showing the improved shock absorber associated with a vehicle frame and spring.

Referring with particularity to the drawing, the improved shock absorber is designated as an entirety by A, and the same includes in the present embodiment friction members $a$ and $b$, a casing $c$ for confining said friction members, means $d$ for moving the friction member $a$, and means $e$ associated with the means $d$, all of which elements may be used in practicing one embodiment of the invention.

The device A is adapted to be secured in the present instance to a vehicle frame such as shown in Figure 1 at 1, and such device may control action of the leaf spring 2 of said vehicle. As is customary, leaf springs of the type shown are mounted upon an axle 3, there being a clamp 4 fitted to the axle, and a link 5 joined with the clamp and with the extremity of the arm $e$ of the shock absorber. As the spring acts and re-acts the link will of course move, which in turn will move the arm $e$ to operate the shock absorber. The present shock absorber is of the progressive type, which is to say, the friction increases as the arm is moved from a selected position. If the arm is in the selected position in Fig. 1 then movement in either direction will be resisted in progressively increasing amounts. This distinction is made in order to differentiate the present invention from that type of shock absorber wherein the friction is constant, either in one direction or in both directions, or from that type of shock absorber which has a certain degree of friction at all times operative, and a greater degree of friction immediately operative to control large re-actions.

The friction member *a* of which there may be a number, comprises in the present instance a metal disc 10 interposed between two friction discs 11 and 12, which friction discs are substantially annular in form. These friction discs may be formed of any suitable material such as leather, and the said discs may be conveniently held in working relation to said member 10 by means of metal eyelets 13. The disc 10 is formed with a square opening 14, and such friction members *a* are adapted to be fitted upon the member *d* which has a stud shaft substantially square in cross section. The stud shaft is formed with a bearing 15 and likewise with a flange base 16. Said stud shaft and its friction members *a* are adapted to be received within the casing *c*. The said casing may be substantially circular in form, although the general shape of the casing is not important, the said casing including a base member 17, a curved side wall 18 joined with the base member, and outwardly extending lugs 19 forming continuations of the base, which lugs are transversely bored as at 20 so that bolts 21 may pass through said bores, the bolts securing the casing to the car frame 1. The base 17 upon the inner confines of the casing is formed with a central raised portion 22, and with a central journal 23, the said journal being received in the bearing 15 of the stud shaft and the flange 16 resting upon the central raised part 22 of the said base. The side wall 18 of the casing is provided upon its inner surface with one or more webs, ribs or flanges 24, and which members 24 extend from the base of the casing to a point adjacent the rim of the side wall; in other words, the members 24 substantially parallel the central axis of the casing or of the stud shaft. The shape of the members 24 is not important. However, it will be noticed upon examining Fig. 3 that the side walls 25 of such members are tapered.

The lowermost friction member *a* differs from the other friction members, in that a friction disc is placed on but one side of the metal member 10, as shown at 26.

Figure 2:
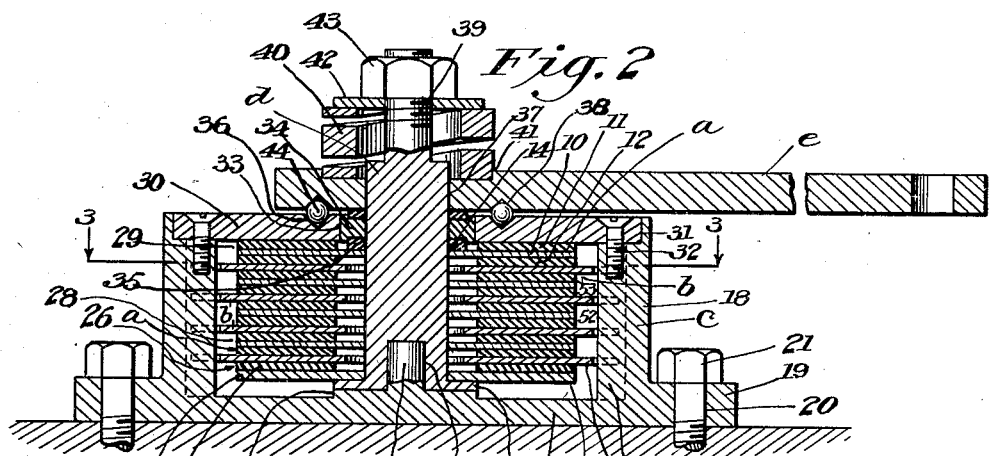
Figure 2 is an enlarged vertical sectional view of the shock absorber and showing details of the construction of the same.
Figures 3, 4:
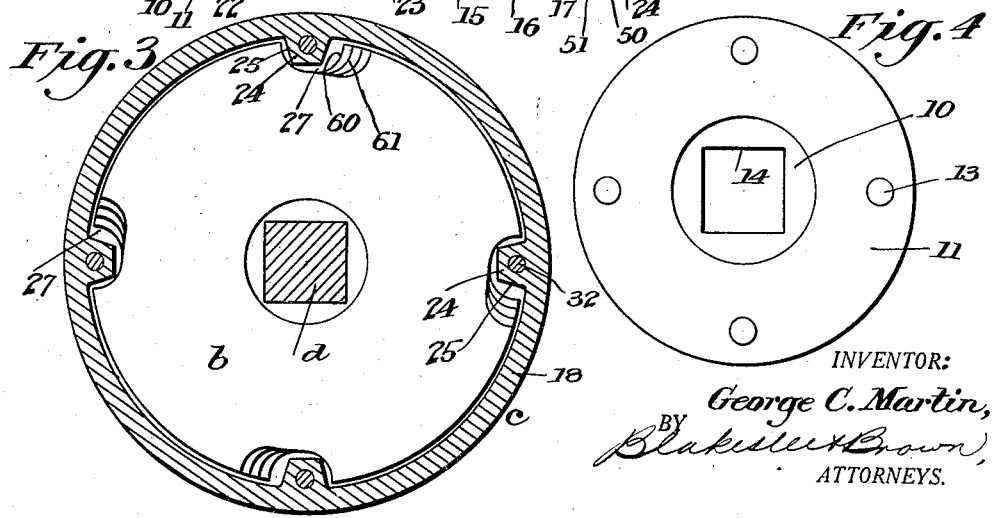
Figure 3 is a cross sectional view on the line 3—3 of Figure 2.
Figure 4 is a plan view of one of the friction discs used in practicing the invention.

The members *b* may in the present instance comprise metal discs which are adapted to be loosely fitted upon the stud shaft *d*, as illustrated in Figure 3. Such members are provided with one or more peripheral cut-away portions or slots 27. Referring to Fig. 2, the friction member *a* shown at 26 would first be fitted upon the stud shaft *d* so that the metal portion thereof would rest upon the flange 16 of said shaft. A member *b* would then be placed upon the said shaft so that the same would bear against the friction disc of the lowermost friction member *a* shown at 26. Next a friction member *a* which has two friction discs with an interposed metallic disc would be placed upon the shaft *d*, as shown in Figure 2, at 28, and so on alternating between the members *a* and *b*. In the present instance there are four members *a* having friction discs upon both sides of a metal disc 10 and four of the members *b*. The last friction member *a* at 29 is adapted to have its uppermost friction disc bear against the inner surface of the casing cover 30. This casing cover is adapted to be fitted within a curved recess 31 in the side wall 18 of the casing and to be held so positioned by screws or other means 32 in screw-threaded engagement with the members 24. The said cover is substantially annular in form, and within the central opening 33 thereof is a bushing 34. This bushing is formed with a squared opening so as to fit closely upon the stud shaft *d*. A felt washer or the like 35 is interposed as between the metal disc of the topmost friction member *a* and the said bushing. The cover is formed with a thrust bearing race 36. The arm *e* is formed with a squared opening 37 and said arm is adapted to be fitted upon the stud shaft *d* exterior the casing, and said arm is provided with a bearing race 38 in complemental relation to the race 36. The stud shaft is reduced as to dimensions and screw-threaded as shown at 39. A coil spring 40 surrounds the said stud shaft and has a portion thereof received within a curved recess 41 of the arm, while a second portion thereof bears against a washer 42 held by means of a nut 43 threaded upon the screw-threaded part 39 of such stud shaft. Before tightening down the said nut upon the stud shaft, thrust bearings 44 are placed between the races of the arm and cover. Thus, when the spring 40 is tightened the friction members will engage one another and the tendency will be to move the stud shaft outwardly from the casing and this movement will cause the topmost friction member to engage the inner surface of the cover of the casing and prevent such outward movement of the stud shaft, and of course a prevention of such outward movement will cause all of the friction members to tightly engage one another.

As before stated, I have in the present instance provided four of the friction members *b*, as shown at 50, 51, 52 and 53. The slots 27 in the different friction members *b* vary as to length, the one in the disc 50 being the least in length with each of the remaining members *b* having the slotted portions increasing progressively as to length, as best shown in Fig. 3. Progressive size or length does not mean that each such slot should vary but slightly as to such length, as the progression may be for any degree desired, and this will depend upon use and circumstances, as well as the number of such friction members within a given casing. The said members 24 are of course received within the said slots 27, and the dimension of the slot 27 for the lowermost member $b$, is in the present instance, slightly greater than the transverse width of such member or members 24.

The operation of the device is as follows:

After the device has been assembled as aforesaid, and the casing filled with proper lubricants, the device is ready for use. If we grasp the arm $e$ and move the said arm anticlockwise, in this connection assuming that there is an arm upon the shaft $d$ in Fig. 3, all of the friction members $a$ and $b$ will move. If the movement of the arm $e$ is slight it is evident that there will be a slight friction, tending to retard such movement, due to the fact that the uppermost friction disc is in frictional engagement at all times with the inner surface of the cover 30. Suppose, however, movement of the arm is continued, the wall 60 bounding the slot 27 of the lowermost friction member $b$ will come into contact with the wall 25 of a member 24. As the arm $e$ is further moved the friction member $a$ in engagement with the surface of the lowermost friction member $b$, will now slide upon the surface of such member $b$, and such sliding movement will of course be a frictional engagement. As the said arm $e$ is further moved the edge 61 bounding the slot 27 of the member $b$ shown at 51 will next contact with the side 25 of a member 24 and movement of this member will then be stopped, which will, when the arm $e$ is moved, cause the next friction member $a$ to be in frictional engagement with the surface of such member $b$ at 51, and so on for the remaining members. When the arm $e$ is moved in the opposite direction the action is reversed, which is to say, the topmost member $b$ will engage one of the members 24 and so on for the members $b$ progressively downwardly from said topmost member. As a result, movement of the arm $e$ from a selected position will gradually increase the friction of such movement as the arm moves in a given direction, and when the arm reaches the excursion of its movement in said direction the friction is of greatest extent for that movement and a reverse movement of the arm will cause the arm to again move with progressively increasing friction until it reaches a neutral position.

Assuming that the device A is upon a motor vehicle action and re-action of the spring 2 for minor irregularities in the roadway will be effectively handled by the topmost friction member $b$, due to its frictional engagement with the cover. Thus corduroy streets are successfully navigated. Larger re-actions of the spring 2 are handled by the remaining friction members, and only the number of friction members needed to control such movement are brought into play. The shock absorber is smooth acting and does not jerk or bind, and yet, substantially free action of the spring 2 is permitted for small or normal re-actions thereof. Controlling movement of the spring or springs in both directions is substantially equivalent to carrying a heavy load in a car, because the moment of inertia of the spring or springs is considerably damped under a heavy load, with the result that the vehicle rides considerably easier or softer, as it is sometimes termed.

It is evident that a shock absorber of this character can be readily fitted to all types and sizes of vehicles, because it is only necessary to vary either the friction between the different discs by adjusting the nut 43 which will vary the spring tension or by varying the number of discs within the casing. This is a distinct factor for the reason that it is unnecessary to provide different shock absorbers for different sized vehicles and what may be termed a "tailor-made" shock absorber is provided for each vehicle, and in accordance with use and circumstances.

It is obvious that various changes and modifications may be made in practicing the invention, in departure from the particular showing of the drawing, without departing from the true spirit of the invention.

Having thus disclosed my invention, I claim and desire to secure by Letters Patent:

1. A shock absorber for vehicles including a casing comprising a hollow body adapted to be attached to the vehicle frame and a cover plate, a plurality of ribs formed on the interior side walls of the casing, a central journal stud at the bottom of the casing, a shaft having a socket portion for receiving said stud, an arm carried by the shaft, a flange on the end of the shaft having the socket, yielding means carried by the shaft for holding the arm in position and also drawing the shaft toward the cover of the casing, a plurality of friction disks interlocked with the shaft and one of said disks having a bearing with the said cover of the casing, and a plurality of progressively acting friction disks alternating with said first named friction disks and each of said last named disks having peripheral notches of varying width adapted to engage with said ribs as the shaft moves through a greater arc from one side to the other of its normal set position.

2. A shock absorber for vehicle comprising a casing including a hollow body adapted to be attached to a part of the vehicle frame, a cover secured to said casing, ribs on the interior side wall of the casing, a journal carried by the bottom wall of the casing, a shaft having a bearing socket for receiving said journal, a flange on the shaft, a plurality of friction disks of relatively small diameter interlocked with said shaft and adapted to rotate therewith, and a plurality of friction disks of larger diameter also mounted on said shaft but free thereof and alternating with said first named friction disks, said last named friction disks having peripheral notches of varying width adapted to engage with said ribs on the casing when progressively picked up by the first named disks, an arm carried by the shaft, a spring mounted about said shaft and bearing on said arm, and adjustable nut and washer means on said shaft for compressing said spring to hold the arm in place and also draw all of said friction disks in binding relation with the inside of the cover of the casing.

In testimony whereof, I have signed my name.

GEORGE C. MARTIN.